8/16/83 OR 4,399,345

United States Patent [19]

Lapham et al.

[11] 4,399,345

[45] Aug. 16, 1983

[54] LASER TRIMMING OF CIRCUIT ELEMENTS ON SEMICONDUCTIVE SUBSTRATES

[75] Inventors: Jerome F. Lapham; Tommy D. Clark, both of Westford, Mass.

[73] Assignee: Analog Devices, Inc., Norwood, Mass.

[21] Appl. No.: 272,054

[22] Filed: Jun. 9, 1981

[51] Int. Cl.³ .............................................. B23K 27/00

[52] U.S. Cl. ........................ 219/121 LJ; 219/121 LB; 372/20

[58] Field of Search .................. 219/121 LH, 121 LJ, 219/121 LB; 148/1.5; 372/20; 357/91

[56] References Cited

U.S. PATENT DOCUMENTS

| | | | |
|---|---|---|---|
| 3,439,169 | 4/1969 | Lynch | 372/20 X |
| 4,179,310 | 12/1979 | Compton et al. | 357/91 |
| 4,272,733 | 6/1981 | Walling et al. | 372/20 |

*Primary Examiner*—C. L. Albritton

*Attorney, Agent, or Firm*—Parmelee, Bollinger & Bramblett

[57] ABSTRACT

A method of laser trimming thin film resistors on semiconductive substrates wherein the laser is set to a frequency equal to or less than $E_g/h$, where $E_g$ is the optical band-gap energy of the doped semiconductor substrate, and h is Planck's constant.

7 Claims, 1 Drawing Figure

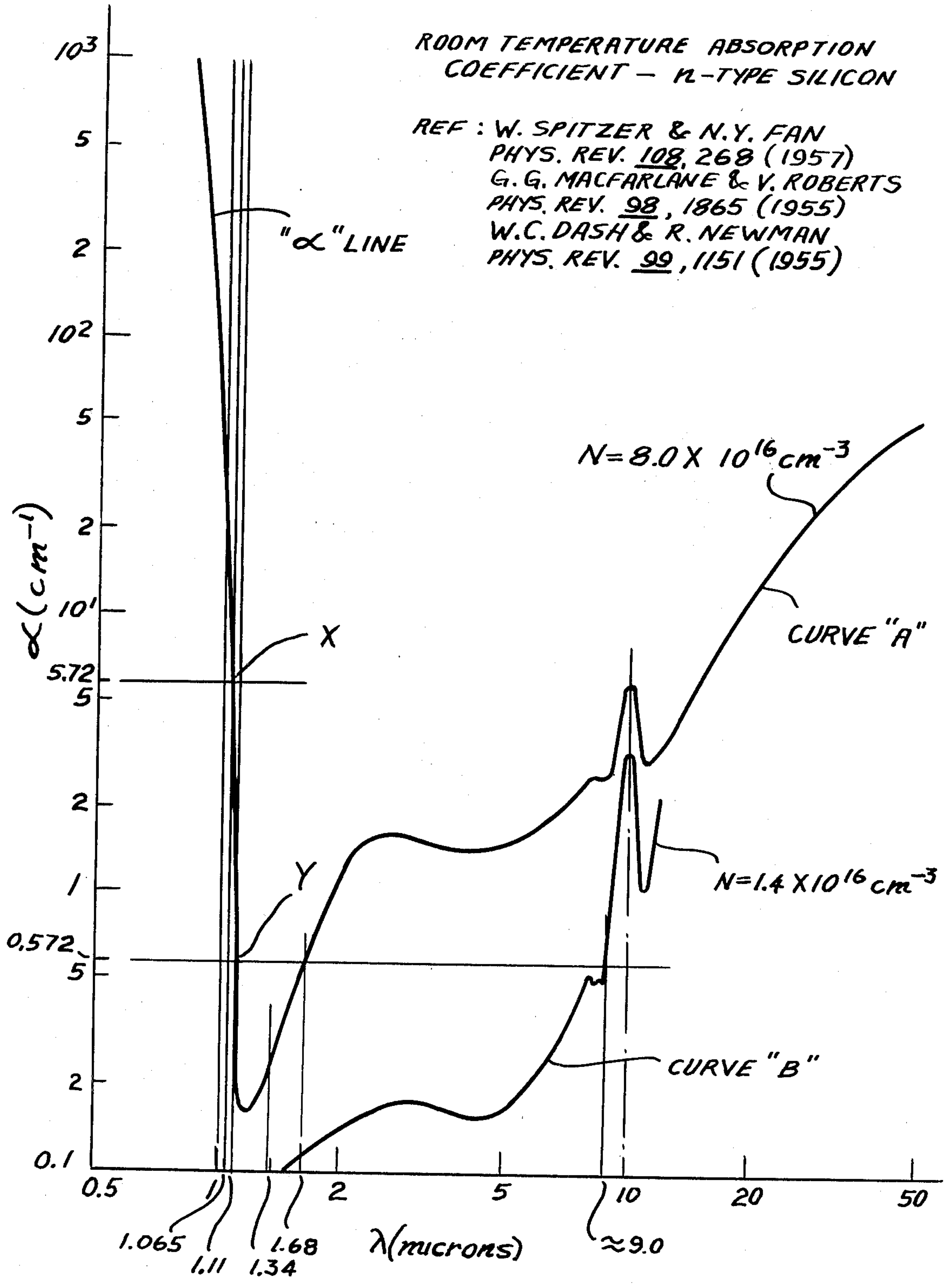
ROOM TEMPERATURE ABSORPTION COEFFICIENT – n-TYPE SILICON
REF: W. SPITZER & N.Y. FAN PHYS. REV. 108, 268 (1957)
G.G. MACFARLANE & V. ROBERTS PHYS. REV. 98, 1865 (1955)
W.C. DASH & R. NEWMAN PHYS. REV. 99, 1151 (1955)
"α" LINE
X
Y
N=8.0 X 10^16 cm^-3
CURVE "A"
N=1.4 X 10^16 cm^-3
CURVE "B"
α (cm^-1)
10^3
5
2
10^2
5
2
10^1
5.72
5
2
1
0.572
5
2
0.1
0.5
1
2
5
10
20
50
1.065
1.11
1.34
1.68
≈9.0
λ (microns)

LASER TRIMMING OF CIRCUIT ELEMENTS ON SEMICONDUCTIVE SUBSTRATES

BACKGROUND OF THE INVENTION

This invention relates to semiconductive devices. More particularly, this invention relates to such devices carrying circuit elements such as thin film resistors which are trimmed to specified electrical characteristics by the use of a laser beam directed onto the element.

Integrated-circuit components commonly comprise a semiconductor substrate, typically doped Silicon, carrying a combination of active and/or passive circuit elements. In many cases, such circuit elements include thin films of electrically-conductive material forming electrical resistors, and separated from the substrate by dielectric material.

In order to set the value of such a circuit element precisely at a prescribed magnitude, the processing of semiconductive components often includes a procedure referred to as laser trimming. In that procedure, a focused laser beam is directed onto the circuit element, and controlled so as to vaporize or otherwise remove or alter the material of the element. During or following this operation, the value of the circuit element is monitored by associated measuring equipment, and the laser trimming is stopped when that value reaches a directly or indirectly specified magnitude. There have been many disclosures of various means for carrying out laser trimming procedures, e.g. as shown in U.S. Pat. No. 3,699,649, and other patents cited therein.

One of the problems encountered in such laser trimming operations is that semiconductive substrates are not transparent to the laser beam (as are glass substrates), and absorption of laser energy by the substrate can cause substantial generation of heat. This in turn can result in damage to the substrate material, or alteration of the characteristics of regions of the substrate or material on the substrate such as surface dielectric or resistor material, so as to adversely affect the component performance.

In such circumstances, it has been a common practice simply to reduce the power level of the incident laser beam, as by means of filters or the like, to a level sufficiently low that no significant injury will be sustained by the substrate or associated elements. However, that solution to the problem has not been entirely satisfactory since in many cases low-power laser beam are not capable of achieving the required high-performance in trimming the circuit element. For example, at such lower power levels the laser cut generally will not be as clean, and in any event the stability or noise characteristics of the circuit element often will be significantly better when trimmed with relatively high-power laser beams.

Accordingly, it is an object of this invention to provide means and methods for laser-trimming circuit elements on semiconductive substrates at relatively high power levels, yet without generating excessive heat in the substrate.

SUMMARY OF THE INVENTION

The absorption of laser-beam energy by a semiconductive substrate is a function of the laser wavelength, and is related to the band-up energy level of the substrate material. With substrates made for example of Silicon, and employing trimming lasers of the kind typically used in commercial integrated-circuit processing (such as the Yttrium Aluminum Garnet neodynium doped laser), the substrate is quite absorptive to radiant energy, especially as a result of interband transitions in the Silicon. That is, with such commercially-used systems, the laser wavelength is such as to produce quanta of energy above the threshold band-gap energy level in the substrate. Thus a considerable amount of the laser energy is absorbed in the substrate, with consequent generation of relatively high heat.

The YAG neodynium doped laser referred to above, for example, produces a beam having a wavelength of essentially 1.065 microns. The photon energy for a wavelength of 1.065 microns is approximately 1.16 eV (electron volts). Now, the band-gap energy level of Silicon, doped for use in some typical semiconductive substrates, is about 1.15 eV. Thus, there is substantial absorption in the substrate of the energy of a laser beam of such wavelength, leading to the over-heating problem discussed above.

In accordance with the present invention, trimming is effected by a laser selected and/or adjusted to have a wavelength sufficiently high that the photon energy in the beam it emits will be less than the band-gap energy level of the doped semiconductive substrate material. Expressing this relationship in another way, the laser beam frequency should be less than $E_g/h$, where $E_g$ is the optical band-gap energy of the doped substrate, and "h" is Planck's constant. The result is a much reduced level of energy adsorption in the substrate, so that higher-powered laser beams can be used for trimming.

Other objects, aspects and advantages of the invention will in part be pointed out in, and in part apparent from, the following description of a preferred embodiment considered together with the accompanying drawing.

BRIEF DESCRIPTION OF THE DRAWING

The FIGURE is a graph illustrating the room temperature absorption coefficient (α) of n-type Silicon as a function of the wavelength of an incident laser beam.

DETAILED DESCRIPTION OF A PREFERRED EMBODIMENT

The present invention is carried out using well established basic techniques of trimming circuit elements mounted on a semiconductive substrate. In such a procedure, a laser beam is directed onto the circuit element from the side of the substrate carrying the element. The laser beam position relative to the element is so controlled as to vaporize or otherwise remove or alter a portion of the material of the element, so as to achieve desired electrical characteristics for the element. While the beam is incident on the element, a portion of the beam reaches the substrate itself, and is absorbed thereby in accordance with the absorption coefficient of the doped substrate.

Referring now to the FIGURE, it will be seen that the absorption coefficient of doped Silicon at a wavelength of 1.065 micron (i.e. at the wavelength of the Nd:YAG line commonly used in laser trimming on Silicon) is a relatively high 5.72 $cm^{-1}$ (intersection at point X on the graph). Thus it is that Silicon absorbs considerable energy from such a trimming laser, causing serious difficulties with heat damage when attempts are made to use a relatively high-powered beam for trimming.

In accordance with the present invention, the trimming laser wavelength is increased to a magnitude greater than 1.065 microns, so as to operate on a lower portion of the absorption coefficient curve. Thus the substrate becomes relatively more "transparent" to the laser beam, so as to reduce the heating effects caused by absorption from interband transitions.

Preferably, the laser beam under the circumstances of the FIGURE provides radiant energy at a wavelength to reduce the absorption coefficient by at least a factor of 10:1, i.e. from 5.72 $cm^{-1}$ to 0.572 $cm^{-1}$ (point Y on the curve). From the graph of the FIGURE this result is achieved at a wavelength of 1.11 microns. For even higher wavelengths, the absorption coefficient continues to fall, and thus such higher wavelengths also can be used with advantage.

For a doping level of $8.0\times10^{16}$ $cm^{-3}$ (curve A), there is a more than 10:1 reduction in energy absorption throughout the wavelength range from about 1.1 microns to about 1.68 microns. For a doping level of $1.4\times10^{16}$ $cm^{-3}$ (curve B), the order-of-magnitude (or larger) reduction in energy absorption occurs throughout the wavelength range from about 1.11 microns to about 9 microns. In general, it is considered that an appropriate range of wavelength for a trimming laser to be used with Silicon substrates is from about 1.1 microns to about 10 microns.

It should be noted that the commonly used Nd:YAG laser can be tuned to emit various wavelengths other than the principal wavelength of 1.065 microns. In particular, such a laser can be tuned to emit energy on a line having a wavelength of about 1.34 microns. It will be seen that this feature of such a commercially suitable laser is particularly valuable, since a wavelength of about 1.34 microns results in an absorption coefficient for Silicon which is very close to the minimum, and significantly more than an order of magnitude below the absorption at the principal line of 1.065 microns.

It will be seen from the FIGURE that the upper wavelength limit for the trimming laser in accordance with the invention depends upon the amount of doping in the semiconductive substrate. Curve B represents a doping level which is typical for use with certain types of thin-film resistors on Silicon. Thus, for the common application of trimming thin film resistors on Silicon the upper limit may be considered to be about 9 microns.

Other factors which for any type of application can set an upper limit on the wavelength for the trimming laser are lattice, free carrier, defect and other absorption phenomena wherein the radiant energy is coupled directly to the substrate matter to produce high absorption with considerable generation of heat. Thus, the laser wavelength should be below that producing such absorption phenomena.

Although a preferred embodiment of the invention has been disclosed herein in detail, it is to be understood that this is for the purpose of illustrating the invention, and should not be construed as necessarily limiting the scope of the invention.

What is claimed is:

1. The method of laser trimming of elements on a doped semiconductive substrate, wherein a laser beam is directed onto the element from the side of the substrate carrying the element and is so controlled as to vaporize or otherwise remove or alter the material of the element so as to achieve a predetermined electrical characteristic for the element; said method further comprising the step of setting the frequency of the laser at a value no greater than $E_g/h$, where $E_g$ is the optical band-gap energy of the doped substrate and h is Planck's constant.

2. The method of laser trimming of elements on a doped semiconductive substrate, wherein a laser beam is directed onto the element from the side of the substrate carrying the element and is so controlled as to vaporize or otherwise remove or alter the material of the element so as to achieve a predetermined electrical characteristic for the element; said method comprising the step of setting the laser to operate at a wavelength producing photons having an energy less than the optical band-gap energy of the doped substrate.

3. The method of claim 2, wherein the substrate is Silicon, and said laser wavelength is greater than 1.065 microns and is set at a value resulting in an absorption coefficient for said doped substrate at least 10:1 less than the absorption coefficient at 1.065 microns.

4. The method of claim 3, wherein said laser wavelength is set at a value of at least 1.1 microns.

5. The method of claim 4, wherein said laser wavelength is set at a value between 1.1 microns and 10 microns.

6. The method of claim 5, wherein said elements are thin-film resistors, and said laser wavelength is set at a value within the range of from 1.1 microns to 9 microns.

7. The method of claim 3, wherein said laser beam is produced by a YAG neodymium doped laser operated at a wavelength of about 1.34 microns.

* * * * *